Nov. 10, 1942.　　　　R. A. ONSTOTT　　　　2,301,639
PORTABLE RACK FOR HOLDING BASKETS OF ARTICLES
Filed Jan. 29, 1941　　　3 Sheets-Sheet 1

Inventor
Robert A. Onstott
By Bryant & Lowry
Attorneys

Nov. 10, 1942.   R. A. ONSTOTT   2,301,639
PORTABLE RACK FOR HOLDING BASKETS OF ARTICLES
Filed Jan. 29, 1941   3 Sheets-Sheet 2
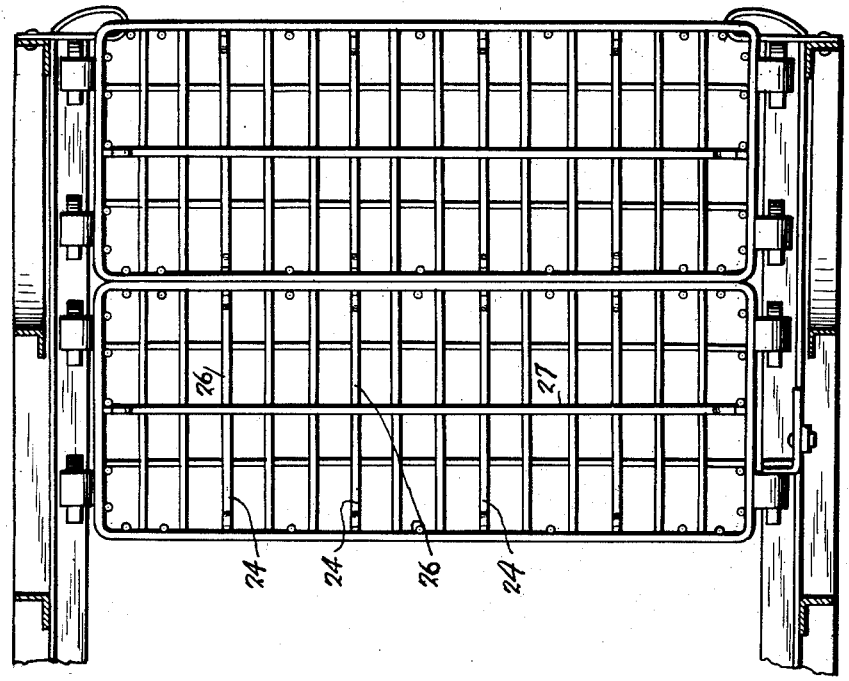
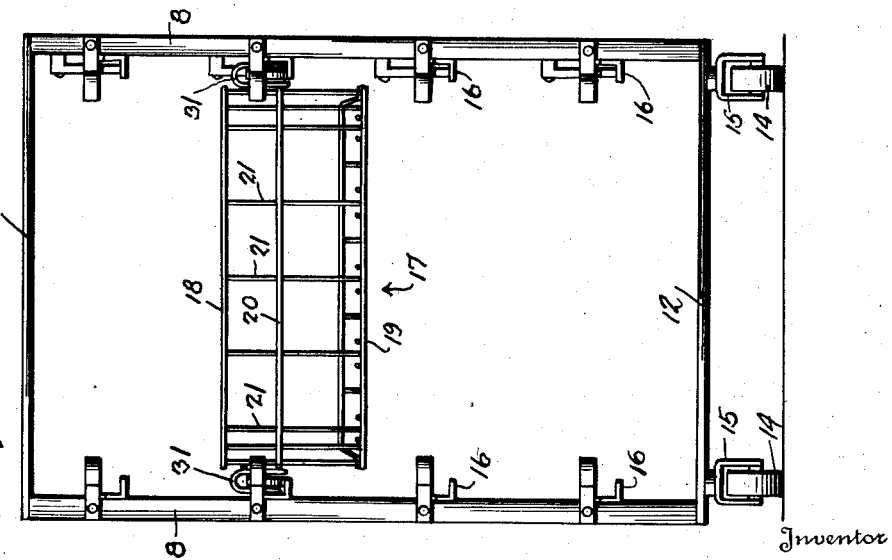
Inventor
Robert A. Onstott
By Bryant & Lowry
Attorneys Patented Nov. 10, 1942

2,301,639

UNITED STATES PATENT OFFICE 2,301,639

PORTABLE RACK FOR HOLDING BASKETS OF ARTICLES

Robert A. Onstott, Pittsburgh, Pa., assignor to Margaret F. Onstott, Pittsburgh, Pa.

Application January 29, 1941, Serial No. 376,550

1 Claim. (Cl. 214—65)

This invention relates to improvements in portable racks for holding baskets of articles and the invention contemplates the use of such a rack to be used in connection with a motor truck or other vehicle.

The primary object of this invention aims to provide a portable truck or rack including a rectangular framework having along the side walls thereof opposed horizontal trackways for accommodating a series of baskets supported by rollers capable of moving from one end of the truck or rack to the other whereby said truck or rack may be loaded by filling the same with the baskets and then moving the truck or rack from the filling point to the motor vehicle where said truck or rack may be slid into the vehicle with its baskets in a filled condition.

A further object of this invention is to provide a portable truck or rack of the above mentioned character which may be bodily moved into a motor vehicle so that the driver thereof may deliver the articles in the baskets from the front of the truck or rack and as the baskets are emptied they may be removed from the front portion of the rack adjacent the driver's seat of the vehicle and inserted in the rear portion of the rack.

A still further object of this invention is to provide a portable rack particularly intended for handling dairy products such as bottled milk and in which the bottles of milk may be placed in suitable baskets capable of sliding on the trackways in the truck or rack toward the front thereof and being locked against movement in the opposite direction by suitable latch devices carried by the opposed horizontal tracks, thereby preventing the displacement of the baskets should the vehicle be stopped on an inclined surface.

A still further object of this invention is to provide a portable truck or rack of the above mentioned character having suitable latch devices adjacent its front end capable of engaging the foremost basket to prevent its displacement accidentally toward the front end of the rack or truck and possible injury to the driver of the motor vehicle should one of the baskets be thrown forward when the motor vehicle comes to an abrupt stop.

Other objects and advantages of the invention will become apparent during the following description of the drawings, wherein, Figure 1 is a side elevational view of the portable truck or rack embodying this invention, illustrating the opposed trackways and showing one of the pairs of tracks filled with milk bottle supporting baskets;

Figure 2 is a rear elevational view of the truck or rack showing the manner in which the baskets are slidably supported thereby between the opposed trackways;

Figure 3 is a horizontal cross-sectional view taken on line 3—3 of Figure 1, looking in the direction of the arrows and further illustrating the manner in which the milk bottle holder baskets are slidably supported by rollers on the opposed trackways;

Figure 1:
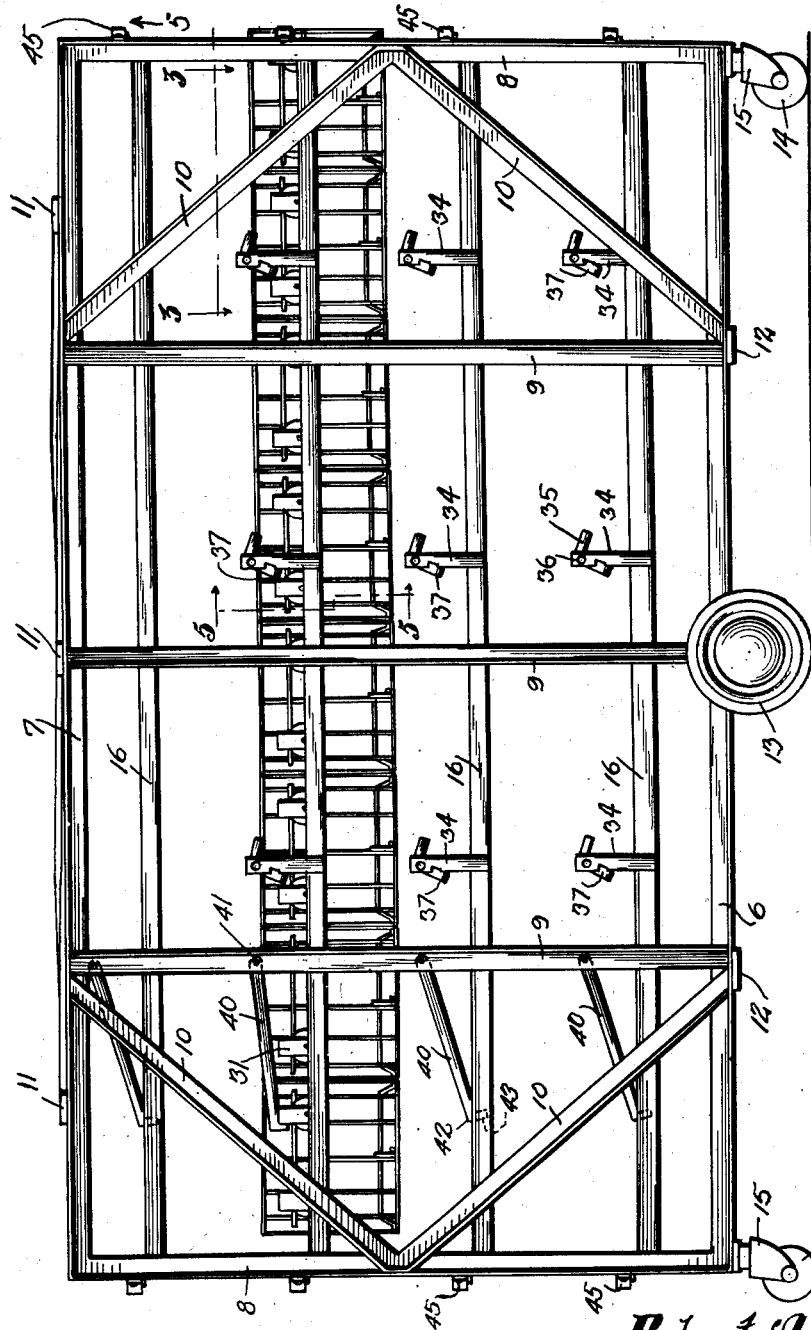
Figure 4:
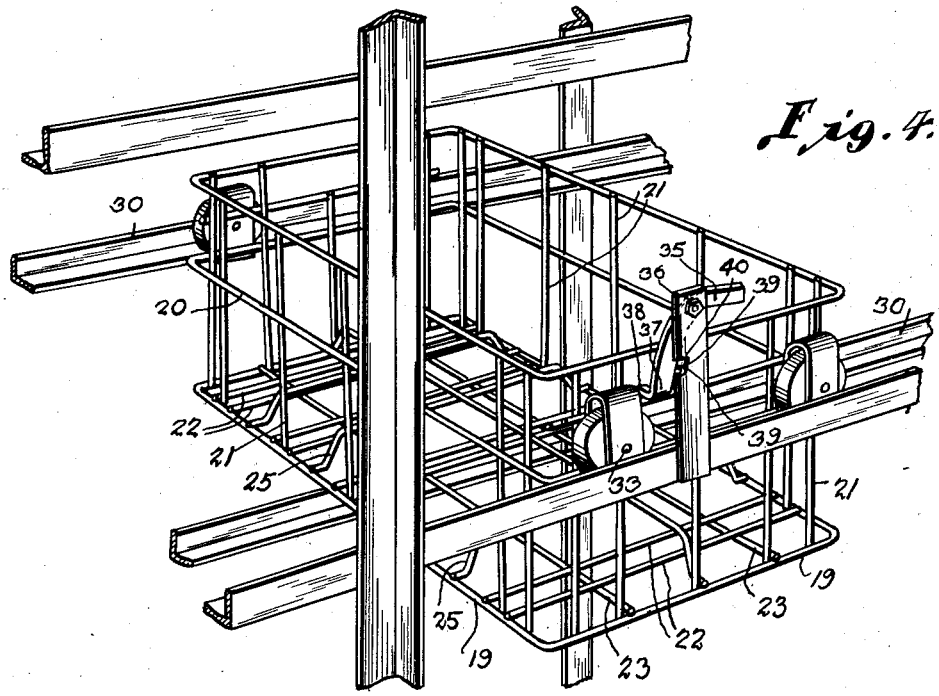
Figure 5:
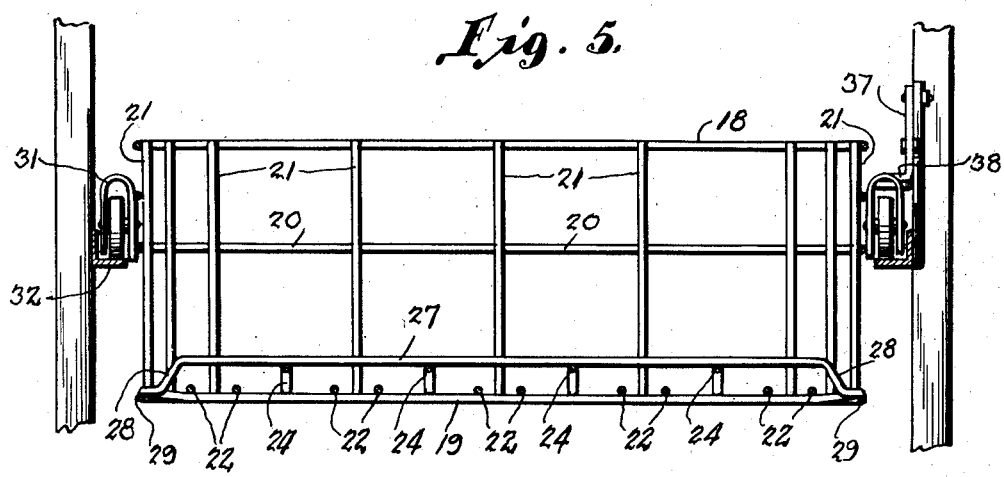

Figure 4 is a perspective view illustrating one of the milk bottle holding baskets supported on the trackways and showing the stop members for allowing a uni-directional movement of the baskets toward the front end of the truck or rack; and Figure 5 is a vertical cross sectional view taken on line 5—5 of Figure 1, illustrating in detail the construction of the milk bottle holding basket and showing the U-shaped roller supporting straps connected thereto which are engaged by the stop members.

In the drawings wherein for the purpose of illustrating the invention and wherein like reference characters will be employed to designate like parts throughout the same, the reference character 5 will generally be employed to designate a portable rack or truck including side frame members composed of lower parallel horizontal bars 6 and upper horizontal parallel bars 7 connected at the ends by spaced parallel vertical bars 8. Suitable vertical brace bars 9 may connect the lower and upper horizontal bars 6 and 7 and diagonal brace bars 10 may be secured to the ends as at 8 and to the upper and lower horizontal bars 6 and 7 for the purpose of further reinforcing the rectangular side frames. The side frames may be connected at each end by suitable transverse bars 11 and 12 connecting the upper parallel horizontal bars 7 and the lower parallel horizontal bars 6 respectively.

The above mentioned frame bars may be connected by suitable nuts and bolts or by welding at the points of connection to form a rigid framework open at both ends as shown in Figure 2.

Suitable wheels 13 may be connected to the lower horizontal frame bars 6 intermediate the ends thereof for the purpose of rolling the truck or rack in and out of a dairy and the ends of the lower parallel horizontal bars 6 may be provided with casters 14 supported by caster yokes 15 pivotally attached to the framework and capable of swinging movement to allow a turning motion to the casters enabling the truck to be guided in different directions.

Supported by the vertical end bars 8, vertical brace bars 9 and diagonal brace bars 10 are horizontal angle bars 16 arranged in vertical spaced relation so that the angle portions extend inwardly and in opposed relation thereby forming horizontal trackways for receiving a wire frame basket which will be hereinafter more fully described.

Each set of trackways is adapted to support a wire frame basket generally designated as at 17, the sides and ends of which are formed by upper and lower horizontal wires 18 and 19 respectively and an intermediate wire 20 connected by vertical wire members 21. The bottom wall of the basket is formed by a plurality of spaced wire members 22 extending transversely thereof and connect with longitudinally extending wire members 23. It will be noted that the transverse wire members 22 are arranged in pairs in spaced relation to form a milk bottle bottom engaging area and that spaced transverse wire rods 24 have their ends connected to the longitudinal portions of the lower wire rod 19 and are provided with offset portions 25 thereby causing the intermediate portion 26 to lie above the plane of the transverse wire rods 22 and longitudinal wire rods 23. A longitudinal central divisional wire rod 27 connects the transverse wire rods at the intermediate portions thereof, designated by the reference character 24 and has its ends provided with offset portions 28 terminating in a union as at 29 with the lower end bars 19 of the wire frame basket.

In this manner, a basket is formed having partitions or cells for receiving bottles of milk or other dairy products. Secured to the vertical end bars 21 of the wire frame basket are transverse wire bars 30 which with the end horizontal bars 20 form a support for U-shaped straps 31 in which is rotatably mounted a supporting roller 32 as by means of a pivot pin 33. The U-shaped strap 31 may be welded to the opposite ends of the wire rod 30 and to the corresponding position of the end horizontal bars 20 of the intermediate frame member.

It is to be understood that the horizontal and vertical wire rods forming the framework basket may be welded together at their juncture and terminals or other means of fastening may be provided.

In order to prevent the baskets from sliding rearwardly of the truck or rack, latch bars are provided and include vertical arms 34 carried by the horizontal track bar 16 at spaced intervals thereon. The vertical supporting arms 34 may be welded or otherwise fastened in place and to the upper end thereof there is pivotally attached an angle latch bar 35 as at 36 having the free end thereof as at 37 angularly bent to form a stop lug 38 in the path of the U-shaped roller supporting saddles 33. Intermediate the pivot point 36 and free end 37 of the latch is a lug 39 adapted to engage within a cut-out formed in the vertical supporting arm 34 and thereby prevent the swinging movement of the latch bar in a counterclockwise direction and will prevent the movement of the supported sliding baskets rearwardly of the truck or rack.

The front end of the rack is provided with latch bars 40 having the inner ends pivoted as at 41 to one of the vertical base bars 9 so that the free end as at 42 may have its hooked portion 43 presented in the path of the roller supporting yokes 31 carried by the basket. The latch bars 40 are intended to prevent the baskets from sliding forward and into the way of the driver of the motor vehicle in which the rack is carried.

The end bars 8 of the rack truck are provided with spring latch members 45 which are adapted to engage the wire basket in a frictional manner and further prevent displacement thereof by an accidental sudden motion of the motor vehicle or truck.

In operation, the baskets are loaded with milk bottles or other dairy products and are placed in the rear end of the truck and slid forwardly to the front end thereof and are held in place against rearward movement by the latch bars 37. After the truck rack has been completely loaded, it may be transported to the loading platform of the dairy and slid endwise into a milk wagon or truck so that the front end will be adjacent the driver's seat of the motor vehicle milk truck. The driver may deliver the dairy products from the baskets within reach of the driver's seat and as the baskets are emptied, they may be removed from the front end of the truck rack and inserted in the rear end. In this manner, a full basket will always be presented to the delivery man and within easy reach from a position adjacent the driver's seat thereby obviating the necessity of the driver leaving his seat and removing articles from the rear of the truck upon each delivery.

It is to be understood that the form of the invention herewith shown and described is to be taken as the preferred example thereof and that various changes in the shape, size and arrangement of parts may be resorted to without departing from the spirit of the invention or the scope of the subjoined claim.

I claim:

A portable rack truck of the character described comprising a wheeled frame, rectangular side frame members supported on the wheeled frame, transverse bars connecting the side frame members for holding the same in spaced relation, brace bars for reinforcing the rectangular side frame members, superposed trackways arranged in opposed relation at opposite sides of the side frame members, a series of wire frame receptacles adapted to slide on the superposed trackways, roller bearing saddles carried by the ends of the receptacle intermediate the upper and lower ends thereof, track rollers journaled in the saddles for rolling on said tracks, latch bars cooperating with said saddles and pivotally attached to the superposed trackways in spaced relation thereon and adapted to swing to a released position in one direction and to a locking position in the opposite direction.

ROBERT A. ONSTOTT.